United States Patent [19]

Yamada

[11] Patent Number: 4,547,757
[45] Date of Patent: Oct. 15, 1985

[54] ELECTROMAGNET YOKE STRUCTURE

[75] Inventor: Toshiaki Yamada, Higashi Osaka, Japan

[73] Assignee: Matsushita Electric Industrial Co., Ltd., Osaka, Japan

[21] Appl. No.: 456,073

[22] PCT Filed: Apr. 16, 1982

[86] PCT No.: PCT/JP82/00124
§ 371 Date: Dec. 15, 1982
§ 102(e) Date: Dec. 15, 1982

[30] Foreign Application Priority Data

Apr. 17, 1981 [JP] Japan .................................. 56-58720
May 12, 1981 [JP] Japan .................................. 56-70904

[51] Int. Cl.$^4$ ............................................. H01F 7/16
[52] U.S. Cl. ..................................... 335/296; 335/297; 192/84 B; 192/84 C
[58] Field of Search ....................... 335/281, 296, 297; 192/84 B, 84 C

[56] References Cited

U.S. PATENT DOCUMENTS 3,995,244 11/1976 Sayo ...................................... 335/296
4,428,470 1/1984 Bennett et al. .................. 335/297 X Primary Examiner—George Harris
Attorney, Agent, or Firm—Wenderoth, Lind & Ponack

[57] ABSTRACT

An electromagnet including a housing for a load rotary body, an annular movable electromagnet section formed of magnetic material, of U-shaped radial cross section, defining an annular groove, rotatively supported by the housing through bearings, and a fixed electromagnetic section disposed in the annular groove, including a winding coil box body which includes an outer sleeve opposing an outer cylindrical wall of the movable section and an inner sleeve opposing an inner cylindrical wall of the movable body. A magnetic yoke joins the inner and outer sleeves at the open end of the movable section and opposes the inner and outer cylindrical walls of the movable section. A winding coil is bounded by the inner and outer sleeves and the yoke, and the yoke, with the movable electromagnetic section, defining a magnetic path about the winding coil. A flange connects the side of the yoke opposite the coil to the housing so as to support the fixed electromagnetic section on the housing. A lead wire connection for the coil extends circumferentially in a circumferentially extending storage space within the yoke, the yoke also including at least one opening for electrical connection therethrough to the lead wire connection.

6 Claims, 13 Drawing Figures

ELECTROMAGNET YOKE STRUCTURE

TECHNICAL FIELD

The present invention relates to an electromagnetic used in solenoid clutches, etc., and provides an electromagnet which can be made small in size and light in weight and is easy to manufacture, wherein a storage space for the lead wire connections of a coil is defined in the thickness region of a yoke surrounding the coil.

BACKGROUND ART

As an example of prior art, an example of a dry, single plate, double-flux type solenoid clutch is shown in FIG. 1. In this figure, reference numeral 1 denotes a movable electromagnet section mounted on bearings 2 for rotation with respect to the housing 3 of a load rotary body (not shown), said section receiving external power through a V belt (not shown) entrained around a V groove 4 in the outer periphery thereof, whereby it is driven for rotation. A shaft 5 connected to the load rotary body is coaxial with said bearings 2, and a clutch hub 6 formed on one end of said shaft 5 is provided with a movable attraction plate 8 through an elastic body 7, said movable attraction plate 8 being held in opposed relation to one end surface of said movable electromagnet section 1 with a predetermined air gap 9a defined therebetween.

The movable electromagnet section 1 has its movable body 10 made of magnetic material in the form of an annulus of U-shaped cross section wherein its outer and inner cylindrical walls 10a and 10b are integrally connected by an end portion 10c opposed to said movable attraction plate 8, and an annular fixed electromagnet section 11 coaxial with said shaft 5 is inserted into the annular groove of the movable electromagnet section 1 from the open end side 1a thereof.

The fixed electromagnet section 11 comprises a yoke member 12 positioned on the open end side 1a of the movable electromagnet section 1, a coil winding box member 13, and a coil 14 wound inside said box member 13, the latter having a box outer sleeve 13a opposed to the outer cylindrical wall 10a of said movable electromagnet section 1 and a box inner sleeve 13b opposed to the inner cylindrical wall 10b, and being of U-shaped cross section turned in the direction opposite to the open end side 1a of the movable electromagnet section 1, wherein the outer peripheral side of the fixed electromagnet section 11 consisting of the outer peripheral end of the yoke member 12 and the box outer sleeve 13a and the inner peripheral side of the fixed electromagnet section 11 consisting of the inner peripheral end of the yoke member 12 and the box inner sleeve 13b are disposed with respect to the outer and inner cylindrical walls 10a and 10b of the movable electromagnet section 1 in such a manner as to maintain predetermined air gaps 9b and 9c, respectively, and a flange member 15 extending radially inwardly from the side of the yoke member 12 opposite coil 14 to the housing 3 to which it is fixed as by bolts.

Energizing the coil 14 of the fixed electromagnet section 11 produces magnetic flux in a magnetic path illustrated in FIG. 1 by the flux line indicated by reference FIG. 100, through the yoke member 12, movable body 10, movable attraction plate 8, and air gaps 9a, 9b, 9c between the yoke member 12 and movable body 10 and between the movable body 10 and movable attraction plate 8, thus attracting the movable attraction plate 8 to the friction surface of one end of the movable body 10, whereby the rotative force transmitted through the V belt is transmitted to the load rotary body through the shaft 5.

In the solenoid clutch of such construction, if said load rotary body is a compressor for a vehicle air conditioner, the requirement for reducing energy consumption makes it necessary to reduce the size and weight of the solenoid clutch.

Further, it is expected that the type of the compressor to be applied differs for different types of vehicles depending upon what position is assigned thereto relative to other parts in the engine compartment, incurring a limitation which makes it necessary to change the distance from the position of the V grooves 4 of the solenoid clutch to the front end depending upon the type of the vehicle.

In the solenoid clutch of said construction, however, if the distance is reduced by bringing closer to the movable electromagnet section 1 the position at which the flange member 15 fixing the fixed electromagnet section 11 to the housing 3 is attached to the housing 3, then the heads of the bolts by which the flange member 15 is fixed to the housing 3 are positioned excessively close to the end of the inner cylindrical wall 10b of the movable electromagnetic section 1, entailing the danger of causing trouble to the rotating function of the movable electromagnet section 1.

Further, in this type of solenoid clutch, as in the further conventional example shown in FIG. 3, the lead wire connection 16 for the coil 14, besides the coil 14, is received in the coil winding box 13' of the fixed electromagnet section 11', a resin-filled portion 17 is provided between the coil winding box body 13' and the lead wire connection 16 of the coil 14 for providing electric insulation therebetween, and the yoke member 12' is formed with a lead wire insertion hole 12'a. As a result of this construction, the cross-sectional area taken radially of the fixed electromagnet section 11' is increased, imposing a limitation on the way the cross-sectional area of the annular groove of the movable electromagnet section 1 having the fixed electromagnet section 11' mounted therein is reduced (e.g., the inner cylindrical wall 10b is shortened) so as to reduce the weight.

In the conventional example shown in FIG. 1, the coil 14 wound inside the box member 13, as shown in FIG. 2, is stepwise wound, the air gap 18 for receiving the lead wire connection 16 is secured at the corner held between the yoke member 12 and the box inner cylindrical wall 13b, and the cross-sectional area of the coil winding box body 13 is reduced, thereby reducing the size and weight of the movable electromagnet section 1. In this case, however, the winding operation on the coil 14 becomes extremely difficult, greatly lowering productivity, and is therefore uneconomical, and since the winding operation is stepped it is difficult to secure the uniform quality.

In FIG. 1, the yoke member 12 of the fixed electromagnet section 11 cooperating with the movable body 10 to form the magnetic path illustrated by flux line $\phi$ is opposed to the outer and inner cylindrical walls 10a and 10b with air gaps 9b and 9c of predetermined distance $\delta$ defined therebetween, and the magnetic resistance $R_g$ of the air gaps 9b and 9c is expressed by $$R_g = \delta/(K \cdot S)$$

where
- K = permeability of air gap ($4\pi \times 10^{-7}$ wb/ATm),
- δ = air gap distance (m), and
- S = area of yoke member oposed to inner and outer cylindrical walls of movable electromagnet section (m²).

It is known that the magnetic resistance $R_g$ is proportional to the distance δ of the air gaps 9b and 9c and is inversely proportional to the opposed area S. As a method of minimizing the magnetic resistance $R_g$, it may be contemplated in said conventional example to increase the thickness (corresponding to S) of the yoke member 12 or to reduce the distance δ of the air gaps 9b, 9c.

However, since the distance δ of said air gaps 9b, 9c has its minimum value determined by such limitations as the clearance of the bearings 2 used in the solenoid clutch and the rigidity of the movable electromagnet section 1, it is impossible to reduce the distance δ of the air gaps 9b, 9c without limit to minimize the magnetic resistance $R_g$; thus, in this conventional example, the magnetic resistance $R_g$ is reduced by increasing the thickness of the yoke member 12, making it impossible to reduce the size.

In addition, in said conventional example, the movable electromagnetic section 1 and yoke member 12 have their cross-sectional areas determined by the B-H characteristic of the magnetic material used, and as regards the movable electromagnet section 1, the inner and outer cylindrical walls 10b and 10a have their thickness so determined as to be inversely proportional to their diameter, thereby make uniform the magnetic flux density. As for the yoke member 12, if its thickness is made to be inversely proportional to the diameter, this would result in an increase in the magnetic resistance $R_g$; thus, its thickness is made uniform.

SUMMARY OF INVENTION

The present invention provides an electromagnet which can be made small in size and light in weight and is easy to manufacture, wherein the cross-sectional area opposed to the air gap is set to a value close to the maximum allowable value and the cross sections which form the magnetic path in the core yoke are separately calculated and designed, thereby securing a space in a portion of the yoke for storing the coil lead wire connection.

The basics of this invention are shown in FIGS. 4 and 5. Thus, the electromagnet of the present invention comprises, as the fixed electromagnet section 19 in said conventional example, a box body 20 having an annular groove of U-shaped or approximately L-shaped cross-section for winding a coil and a yoke 21 forming the bottom of said box body 20, a storage space 22 peripherally recessed in a region of the yoke 21 (in this example, the lateral surface opposed to the coil 14) for storing a lead wire connection 16, and lead wire insertion holes 21a extending from the storage space 22 to the side of the yoke 21 opposite the coil 14; the movable electromagnet section 1 is the same as in said conventional example. The box outer and inner sleeves 20a and 20b forming the coil winding box body 20 may be made of magnetic material as a member to serve as a mold frame in fixing the coil 14 by injecting resin, with said member forming a portion of the magnetic path, or they may be made of non-magnetic material. Further, the filler resin for insulating and covering the coil 14 may be used to serve as said box outer and inner sleeves 20a and 20b.

The storage space 22 may be peripherally formed throughout the circumference of the yoke 21 or locally on the peripheral surface.

Further, the storage space 22 for the lead wire connection 16 is formed in such a manner that it does not extend so far as the outer and inner surfaces of the yoke 21 opposed to the outer and inner cylindrical walls 10a and 10b of the movable electromagnet section 1 so as to prevent increase of the magnetic resistance $R_g$ in the air gap between the yoke 21 and the movable electromagnet section 1, while the cross-sectional area of the region of the magnetic path in the yoke where the storage space 22 is formed is calculated on the basis of magnetic flux density so as to allow passage of predetermined magnetic flux therethrough.

The magnetic path defined by this electromagnet is as shown in FIG. 12, wherein magnetic flux $\phi_1$ extending from the movable electromagnet section 1 to the movable attraction plate 8 is combined with magnetic flux $\phi_2$ passing through an auxiliary magnetic path extending from the peripheral end of the yoke 21 to the movable electromagnet section 1 in the case where the outer and inner sleeves 20a and 20b of the fixed electromagnet section 19 are made of magnetic material, but in the case where the outer and inner sleeves 20a and 20b of the fixed electromagnet section 19 are made of non-magnetic material, such an auxiliary magnetic path is not formed.

Since the storage space 22 for storing the lead wire connection 16 is formed in a predetermined region of the lateral surface opposed to the coil 14 of the yoke 21 forming the bottom of the U-shaped annular groove of the coil winding box body 20, as described above, the storage space 22 for the lead wire connection 16 can be provided by using only a portion of the thickness of the yoke 21 and the axial length of the fixed electromagnet section 19 can be reduced and so can the size of the movable electromagnet section 1, thereby reducing the weight of the entire solenoid clutch to a great extent.

BRIEF DESCRIPTION OF THE DRAWINGS

FIG. 6 is a longitudinal section view of the present invention;

DETAILED DESCRIPTION OF THE PREFERRED EMBODIMENTS

Figure 1:
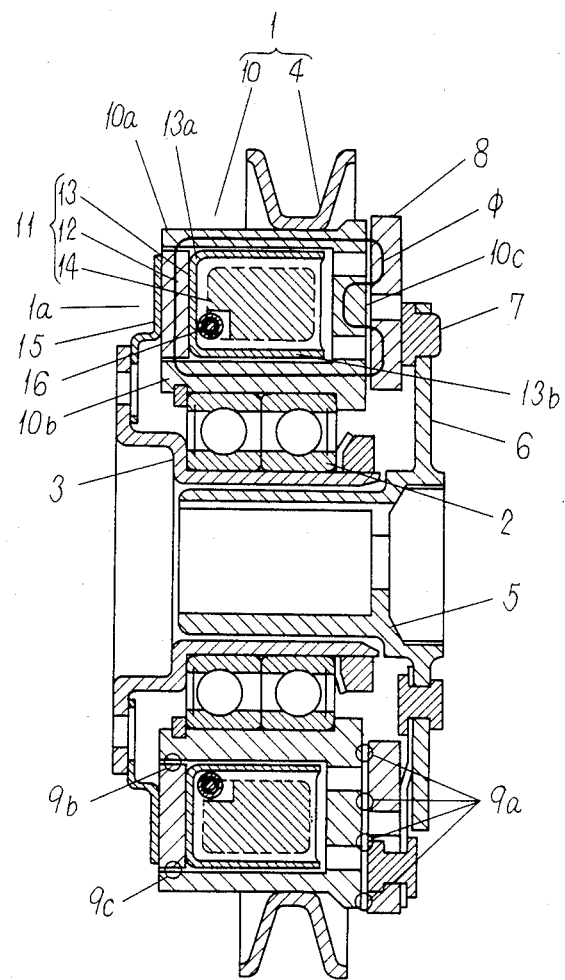
FIG. 1 is a longitudinal sectional view of a conventional solenoid clutch.
Figure 3:
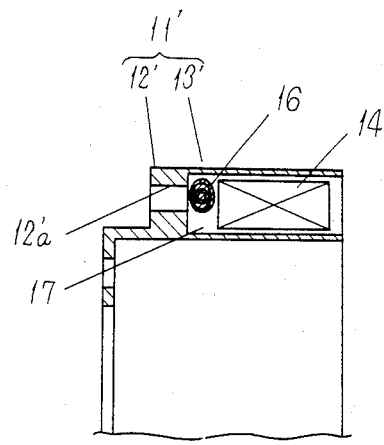
FIG. 3 is a schematic longitudinal sectional view of a fixed electromagnet section according to another conventional example.
Figure 2:
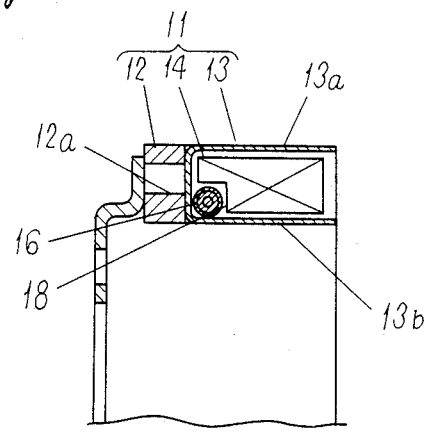
FIG. 2 is a schematic longitudinal sectional view of the fixed electromagnet section thereof.
Figure 4:
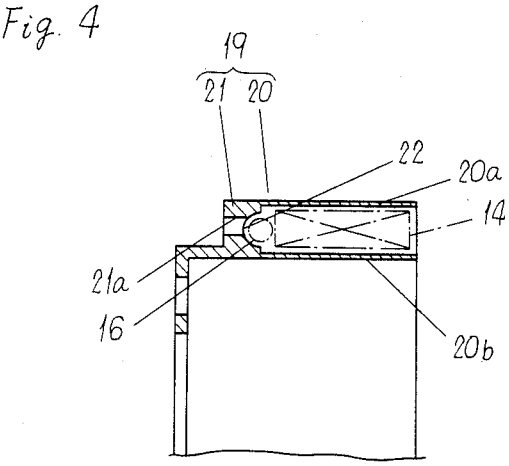
FIGS. 4 and 5 are a longitudinal sectional view of the principal portion and a side view of the principal portion, showing the outline of the invention.
Figure 5:
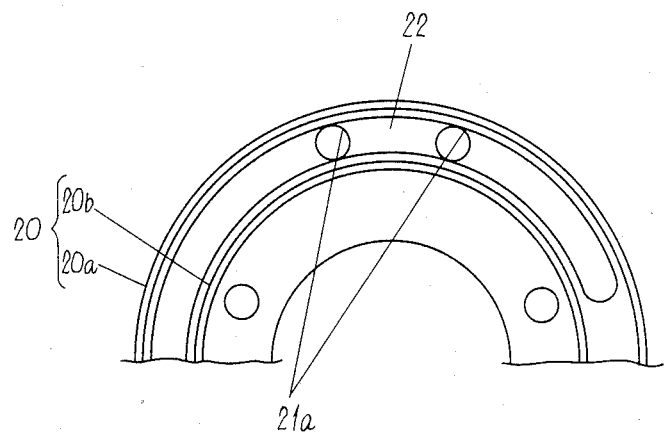
Figure 5:
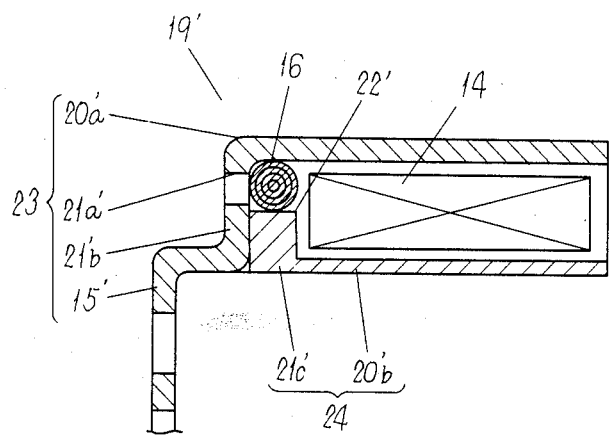

A first embodiment of the invention will now be described with reference to FIG. 6. A fixed electromagnet section 19' comprises a member 23 in the form of a magnetic plate of predetermined thickness bent to form the outer sleeve 20'a of a coil winding box body, the coil-backward facing end 21'b of a yoke and a flange 15', and another member 24 of L-shaped cross section made of magnetic material forming the inner sleeve 20'b of the coil winding box body and the coil-facing end 21'c of the yoke, said members 23 and 24 being put together to define a space which is surrounded by the base of the box outer sleeve 20'a and the ends 21'b and 21'c respectively opposite to and facing coil 14 and which opens to the coil winding side, said space serving as a storage space 22' for a lead wire connection 16, the yoke being constituted of the base of said box outer sleeve 21'a and the yoke ends 21'b and 21'c.

The thickness of the box inner sleeve 20'b integral with the coil-facing end 21'c is less than the thickness of the box outer sleeve 20'a so that it is inversely proportional to the diameter, in consideration of the box outer sleeve 20'a.

The region of the coil-facing end 21'b opposed to the storage space 22' is formed with a lead wire insertion hole 21'a. The movable electromagnet section 1 is the same as in the conventional example.

Figure 13:
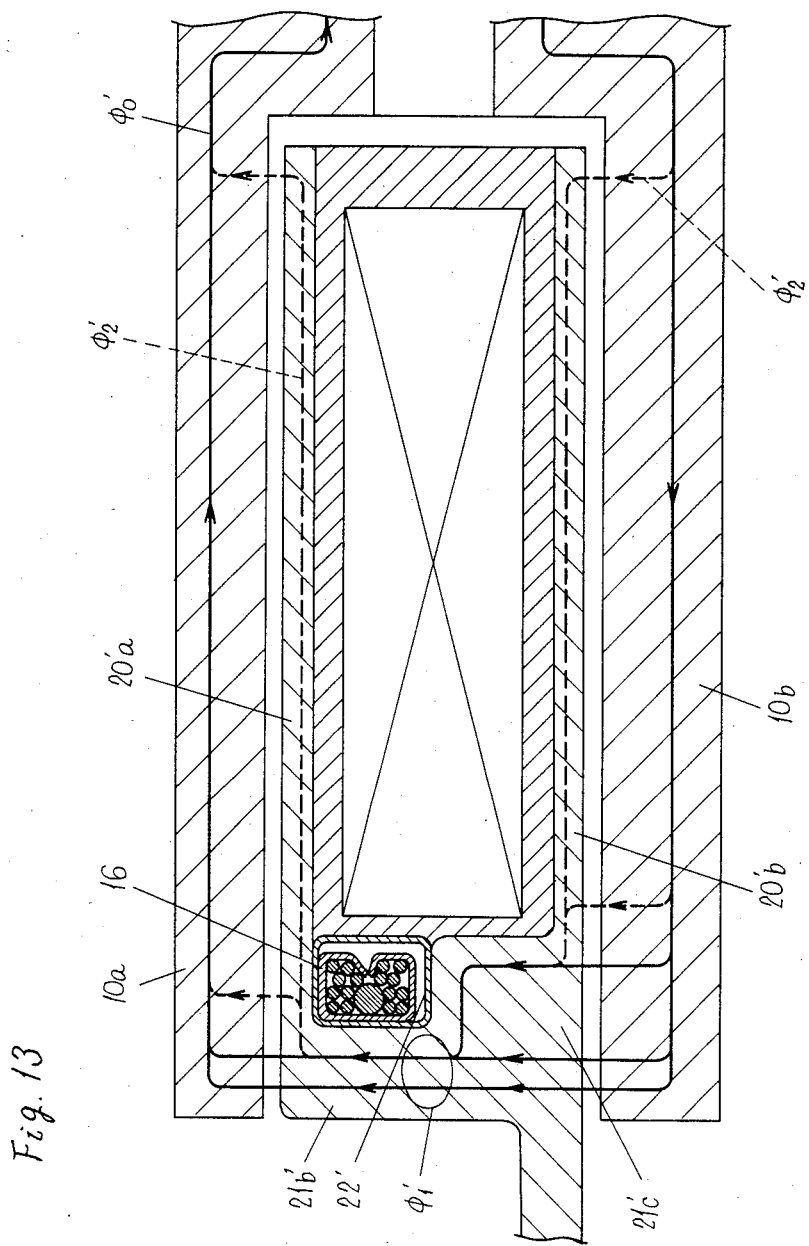

The magnetic path formed by this electromagnet is shown in FIG. 13 wherein magnetic flux $\phi'_1$ passes through the main magnetic path, and magnetic flux $\phi'_2$ passes through the auxiliary magnetic path, the resultant magnetic flux being indicated by $\phi'_0$.

Other effects are the same as those described in the foregoing summary.

Figure 7:
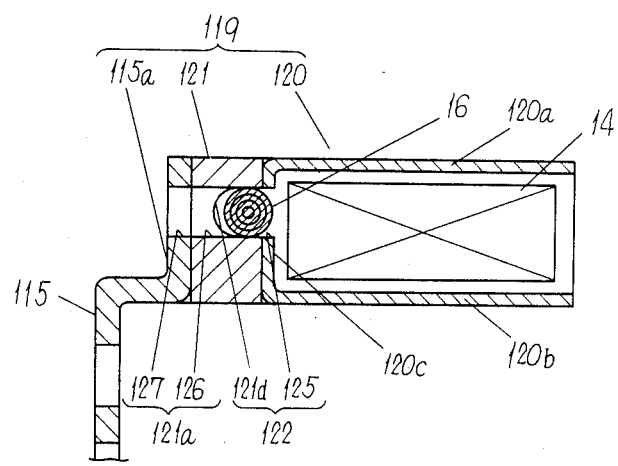
FIG. 7 is a longitudinal sectional view of the principal portion showing a second embodiment of the present invention.

A second embodiment of this invention is shown in FIG. 7. This electromagnet comprises a fixed electromagnet section 119 comprising a coil winding box member 120 in the form of a magnetic plate of predetermined thickness bent into a U-shape to form a box outer sleeve 120a, a box inner sleeve 120b and a coil-facing end 120c, a flange member 115 of magnetic material integrally formed with an end 115a in the outer periphery oppoiste to coil 114, and a yoke main member 121, said members 120, 115 and 121 being integrally connected together, said end 115a, yoke main member 121 and coil-facing end 120c constituting the yoke, wherein a plurality of arcuate grooves 121d peripherally formed on the peripheral surface contacting the coil-facing end 120c of the yoke main member 121, and a hole 125 formed in a predetermined region of the coil facing end 120c opposed to the arcuate groove 121d from the storage space 122 for the lead wire connection 16.

The arcuate groove 121d is formed with a hole 126 extending to the end 115a, and said hole 126 cooperates with a hole 127 formed in the end 115a to provide a lead wire insertion hole 121a.

Because of this arrangement, flange members 115 and coil winding box members 120 of different thicknesses can be combined with a single yoke main member 121 or yoke main members 121 of different thicknesses can be combined with the same flange member 115 and the coil winding box member 120, making it possible to standardize the mechanical parts of the fixed electromagnet section 119 and produce many types of electromagnets at low cost.

Other effects are the same as those described in the foregoing summary.

Figure 12:
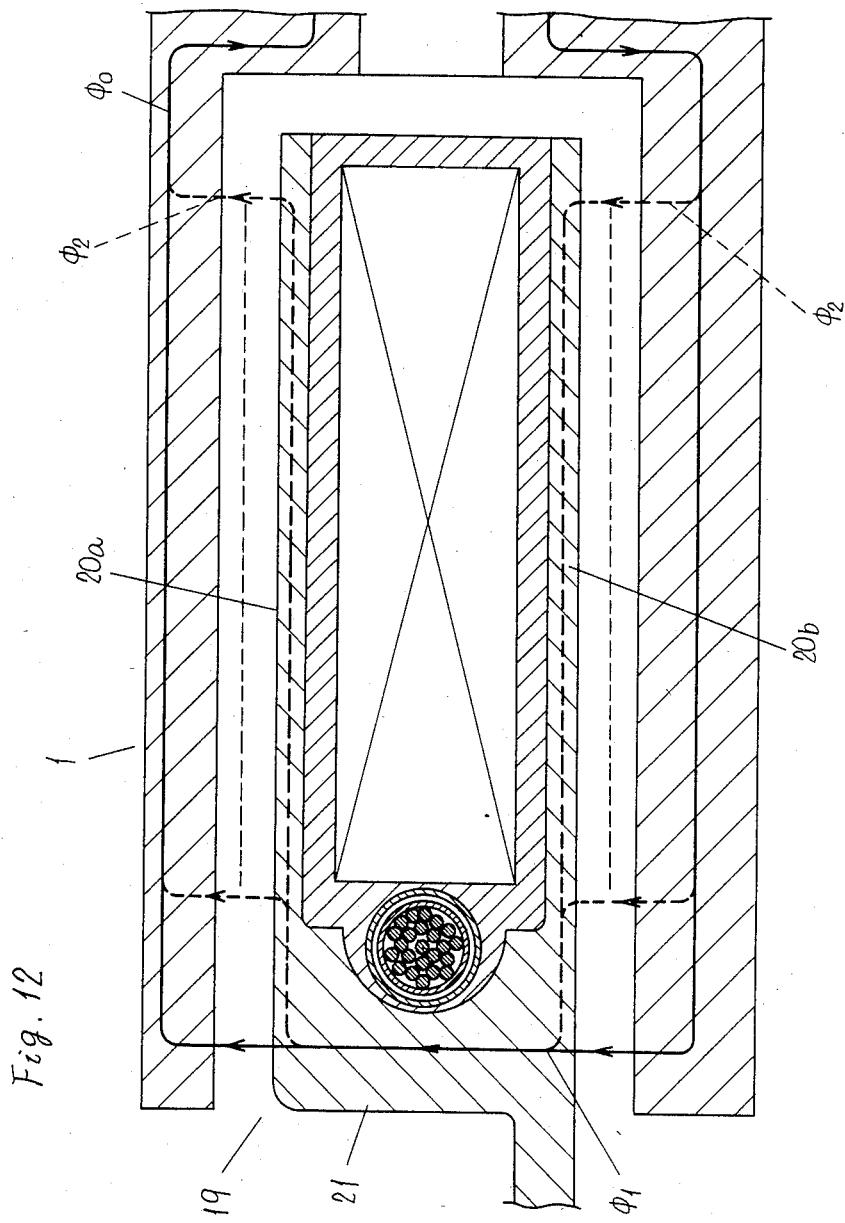
FIGS. 12 and 13 are views explanatory of magnetic flux distribution.

In addition, the magnetic path formed by this electromagnet is the same as that shown in FIG. 12.

Figure 8:
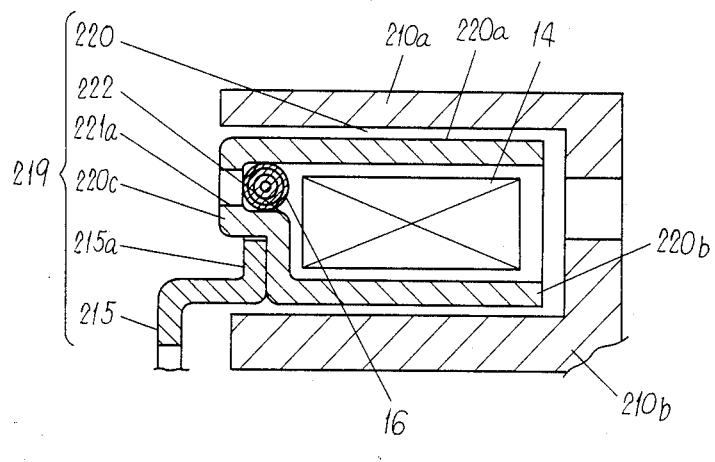
FIG. 8 is a longitudinal sectional view showing a third embodiment of the invention.

A third embodiment of the invention is shown in FIG. 8. This electromagnet comprises a fixed electromagnet section 219 comprising a coil winding box member 220 in the form of a magnetic plate of predetermined thickness formed into an annulus of approximately U-shaped cross section, with the bottom of the U-shaped annular groove, i.e., the upper half of the coil facing end 220c being recessed away from coil 14, to provide a box outer sleeve 220a, a box inner sleeve 220b and storage space 222 for the lead wire connection which are integral with each other, and a flange member 215 in the form of a magnetic plate of predetermined thickness integrally formed on the outer periphery thereof with end 215a opposite coil 14 joined to the lower half of the coil facing end 220c forming the non-recessed region of the coil winding box member 220, said members 220 and 215 being fixed together, wherein the upper half of the coil facing end 220c forming the recessed region of the U-shaped annular groove of said coil winding box member 220, the lower half of the coil facing end 220c forming the non-recessed region, and the end 215a of the flange member 215 forming the yoke.

Therefore, the effective magnetic path cross-sectional area of the yoke is obtained as the sum of the cross-sectional area of the coil facing end 220c of the coil winding box member 220 and the cross-sectional area of the end 215a of the flange member 215, and the thickness of the magnetic plate of which the coil winding box member 220 and flange member 215 are formed is calculated from the magnetic flux density of the magnetic plate so that predetermined magnetic flux may pass through said effective magnetic path cross-sectional area.

The upper half of the coil-forward facing end 220c of the coil winding box member 220 is formed with a lead wire insertion hole 221a. The arrangement of the movable electromagnet section 1 is the same as in the conventional example.

Thus, the integral formation of the storage space 222 for the lead wire connection 16 in the coil winding box member 220 does not require troublesome processing, such as machining, in forming the storage space 222 for the lead wire connection 16, and instead makes it possible to form it concurrently with the coil winding box body as by squeezing or press work, while the yoke can also be concurrently formed by fixing the flange member 215 to the coil winding box member 220, so that the entire manufacturing process can be greatly shortened.

Other effects are the same as those described in the foregoing summary.

Figure 9:
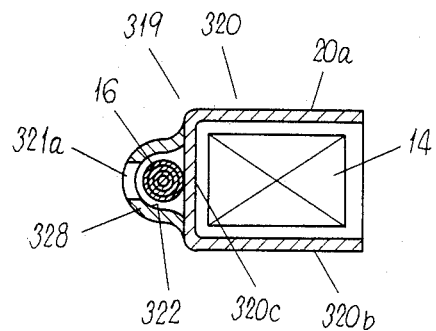
FIG. 9 is a longitudinal sectional view of the principal portion, showing a fourth embodiment of the invention.

A fourth embodiment of the invention is shown in FIG. 9. Thus, this electromagnet comprises a fixed electromagnet section 319 comprising a coil winding box member 320 in the form of a magnetic plate of predetermined thickness formed into an annulus of U-shaped cross section providing a box outer sleeve 320a, a box inner sleeve 320b and a coil facing end 320c which are integral with each other, and a plurality of semi-cylindrical arcuate members 328 of magnetic material peripherally arranged on the side of the coil facing end 320c opposite coil 14, wherein a space surrounded by the arcuate member 328 and the coil winding is used as a storage space 322 for a lead wire connection 16, and the coil-forward facing end 320c of the coil winding box member 320 and the arcuate member 328 constitute the yoke. The lead wire connection 16 is guided to said storage space 322 through a hole (not shown) formed in a portion of the coil facing end 320c of the coil winding box member 320, and a lead wire insertion passage hole 321a is formed in a portion of the arcuate member 328. The arrangement of the movable electromagnet section 1 is the same as in the conventional example.

As in the third embodiment, this arrangement has the effect of simplifying the manufacturing process without involving machining in forming the storage space 322 for the lead wire connection 16.

Other effects are the same as those described in the foregoing summary.

Figure 10:
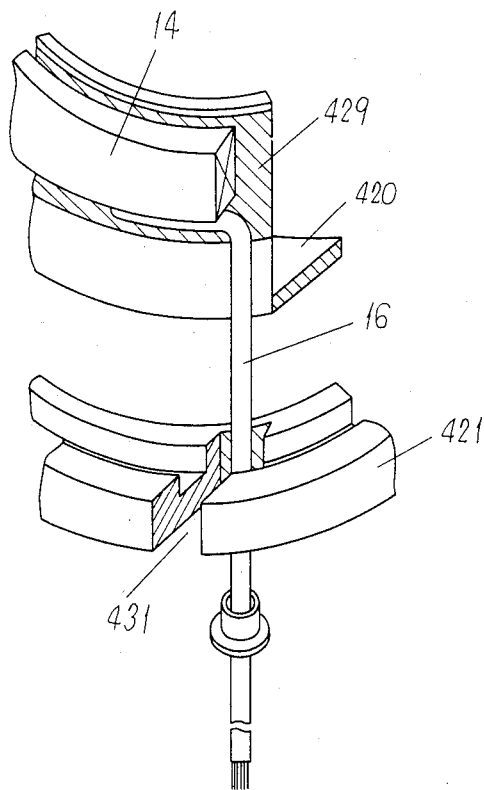
FIG. 10 is a perspective view of the principal portion, showing a fifth embodiment of the invention.
Figure 11:
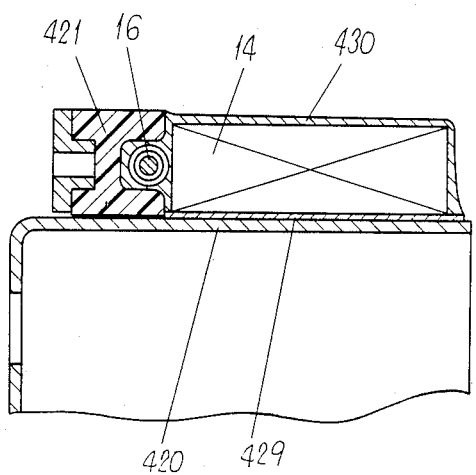
FIG. 11 is a sectional view of the principal portion of the same.

A fifth embodiment of the invention is shown in FIGS. 10 and 11. The outer peripheral surface of an inner electromagnet cylinder 420 (inner sleeve) of L-shaped cross section is coated with an insulator 429 for the purpose of electric insulation from a coil 14, a yoke 421 is pressed in and fixed in position after the completion of connection of the lead wires of the coil 14, and the exposed surface of the coil 14 and the opposed surface of the yoke 421 are coated with a fixing material 430 such as varnish, paint or resin to form an insulation layer which serves also as a covering. A self-fusible electric wire is directly wound on said electromagnet cylinder 420 coated with the insulator 429, thereby forming the coil 14, and with lead wires connected to both ends of the winding, the yoke 421 shown in FIG. 10 is pressed in and fixed in position. The yoke 421 is formed with a lead wire take-out notch 431 shown in FIGS. 10 and 11 to facilitate the take-out of the lead wire.

According to the foregoing arrangement, not only is the manufacture freed from the difficulty of the squeezing process but also the outer diameter of the electromagnet can be greatly reduced without requiring much time in filling with resin.

Other effects are the same as those described above.

INDUSTRIAL APPLICABILITY

As has been described so far, the electromagnet of this invention comprises a movable electromagnet section made of magnetic material having an annular groove of U-shaped cross section surrounded by outer and inner cylindrical walls and rotatably supported by a housing for a load rotary body through bearings, a fixed electromagnet section disposed in the annular groove of said movable electromagnet section, a yoke opposed to said outer cylindrical wall, a coil winding box body in the fixed electromagnet section surrounded by the inner sleeve opposed to said inner cylindrical wall and U-shaped reversely to the cross-section of said movable electromagnet section, a wound in said box body, a yoke for the fixed electromagnet section formed on the coil-end side of said box body opposite the coil to form a magnetic path surrounding said coil, a storage space formed in the high thickness region of said yoke for storing the lead wire connection of the coil, and a flange extending from the end of said yoke opposite the coil and fixedly supporting said fixed electromagnet section on the housing. This arrangement makes it possible to secure the storage space for the lead wire connection to reduce the size and weight of the whole and also secure a sufficient cross-sectional area of effective magnetic path in the yoke to allow passage of predetermined magnetic flux, and provides a satisfactory magnetic characteristic.

I claim:
1. An electromagnet, comprising:
  a. a housing for a load rotary body;
  b. an annular movable electromagnet section formed of magnetic material, of U-shaped radial cross section having an open end and a closed end, defining an annular groove therein, said movable section including radially spaced outer and inner cylindrical walls;
  c. a plurality of bearings, said movable section being rotatable supported by said housing through said bearings;
  d. a fixed electromagnetic section disposed in said annular groove, said fixed section including a winding coil box body which includes an outer sleeve opposing said outer cylindrical wall and an inner sleeve opposing said inner cylindrical wall, and an axially and radially thick magnetic yoke having radially opposite sides, joining said inner and outer sleeves at said open end of said movable section, and opposing said inner and outer cylindrical walls at said radially opposite sides;
  e. a winding coil wound about said inner sleeve, bounded radially outwardly by said outer sleeve and on one axial side by said magnetic yoke, said magnetic yoke with said movable electromagnetic section defining a magnetic path about said winding coil, said magnetic yoke having first and second axially opposite sides respectively facing and opposite said winding coil; and
  f. a flange extending from said second side of said magnetic yoke to said housing and fixedly supporting said fixed section on said housing;
  said winding coil having a circumferentially extending lead wire connection for external electrical connection to said winding coil, said magnetic yoke having a circumferentially extending storage space therein between said radially opposite sides, containing said lead wire connection and having at least one opening therein for electrical connection therethrough to said lead wire connection.

2. An electromagnet as in claim 1, wherein said winding box body is formed of an integral member which includes said outer and inner sleeves and a winding coil facing portion joining said outer and inner sleeves and forming said first side of said magnetic yoke, said flange integrally forming said second side of said magnetic yoke, said yoke further comprising a magnetic main yoke member sandwiched between and united with said first and second sides, said storage space including an arcuate groove in said main yoke member and a axial through hole in said first side of said magnetic yoke opposed to and communicating with said arcuate groove.

3. An electromagnet as in claim 1, further comprising a layer of electrical insulation covering the outer peripheral surface of said inner sleeve so as to electrically insulate said winding coil from said inner sleeve.

4. An electromagnet as in claim 3, wherein said layer of insulation directly coats said inner sleeve.

5. An electromagnet as in claim 3, wherein said coil winding is wound directly on said layer of insulation.

6. An electromagnet as in claim 1, wherein said yoke has a notch formed therein for allowing the lead wire to pass therethrough.

* * * * *